3,391,077
METHOD FOR IMPROVING THE COMBUSTION CHARACTERISTICS OF GASOLINE
Carl Raymond Osborne, 4200 Parke Ave., Terre Haute, Ind. 47805
No Drawing. Filed Apr. 28, 1965, Ser. No. 451,655
3 Claims. (Cl. 208—256)

ABSTRACT OF THE DISCLOSURE

A process for improving the burning characteristics of gasoline fuels for internal combustion engines by mixing the gasoline with a liquid alcohol and tartaric acid mixture, separating the gasoline phase from the alcohol phase and recovering a purified gasoline product.

---

This invention relates to a method for improving the combustion characteristics of gasoline. In particular, this invention is a process for removing components from gasoline which cause imperfect combustion and the production of obnoxious combustion products which pollute the atmosphere.

In summary, the process of this invention is a method for improving the burning characteristics of gasoline fuels for internal combustion engines comprising the steps of mixing gasoline with a liquid alcohol and tartaric acid, permitting the formation of a gasoline phase and an alcohol phase containing gum forming constituents from the mixture, and recovering a purified gasoline phase which forms smaller quantities of obnoxious air pollutants when used as a fuel for internal combustion engines.

Air pollution is a problem of increasing public concern. A principal source of air pollutants, particularly in large cities, is the exhaust gases of internal combustion engines. Some of the dangerous components in these exhaust gases include carbon monoxide and partially oxidized hydrocarbons produced by the incomplete oxidation of gasoline fuels in internal combustion engines. Some medical experts report that these combustion products may be related to the incidence of lung cancer and heart disease.

Elimination of these obnoxious components in the exhaust gases of internal combustion engines is the subject of a great deal of industrial and public research. The principal efforts which have heretofore been made have been in the direction of treatment of the exhaust gases to complete the oxidation of the combustion products, either by use of afterburners, recycle of exhaust gases through the engine, or by the use of chemical oxidation catalysts.

It is one object of this invention to remove components from gasoline which contribute to the incomplete combustion thereof in internal combustion engines.

It is another object of this invention to provide a method for improving the combustion characteristics of gasoline whereby the quantities of obnoxious air pollutants formed therefrom are decreased.

It is another object of this invention to provide a gasoline fuel for internal combustion engines which will undergo a more complete combustion in the engines, thereby delivering more power and work per gallon of fuel.

Distillates of the type from which fuels for internal combustion engines are produced are likely to contain a large amount of preformed gum as well as a large amount of gum forming constituents which form gum on storage. This is particularly true of distillates produced by the widely used thermal and catalytic cracking processes. A variety of processes have been developed for removing these gums and gum forming constituents from the gasoline, and it is believed that most gasolines undergo some chemical treatment to remove these materials before they are marketed.

One widely used technique comprises contacting the contaminated gasoline with concentrated sulfuric acid in the amount of about 3 to 6 pounds per barrel of gasoline. After such an acid treatment, the gasoline may be washed with a dilute caustic soda solution to neutralize the residual acid, then washed with water, and then redistilled. Another technique which has been developed comprises chemically oxidizing the gum forming constituents by heating the gasoline in contact with air or oxygen in a closed container. Usually the oxidized gasoline is then treated with sulfuric acid as described above. Still another technique which has been developed comprises contacting the gasoline with maleic anhydride and removing the precipitated reaction products from the gasoline by filtration, for example.

Despite the wide variety of techniques which have been developed and which are employed to remove undesirable contaminants from gasoline, commercial gasolines have been found to contain contaminants which either themselves do not properly burn in an internal combustion engine or else inhibit proper combustion of gasoline therein. As a result, exhaust gases from internal combustion engines have been found to contain harmful concentrations of partially oxidized hydrocarbons, carbon and other dark particles, carbon monoxide, and other deleterious materials.

The identity of these undesirable components in conventional, processed gasolines has not been determined. However, it has been found that if commercial grade gasoline is treated according to the process of this invention, the gasoline exhibits improved combustion characteristics as shown by an improved power performance and efficiency of the engine and by the much smaller quantity of obnoxious components in the engine exhaust.

In general, the process of this invention comprises contacting gasoline fuel materials with tartaric acid and a liquid alcohol, permitting the formation of a separate alcohol phase, and separating the purified gasoline phase from the alcohol phase.

Tartaric acid is a well known commercially available chemical compound. The alcohols which can be employed in the process of this invention function as solvents for the tartaric acid and apparently form reaction products of tartaric acid with the undesirable components in the gasoline. Any liquid alcohol, i.e., alcohol which is liquid at room temperature, can be employed. Preferably, an alcohol having from 1 to 4 carbons is employed. Included among the preferred alcohols are methyl, ethyl, propyl, isopropyl, butyl, and isobutyl alcohols. Alcohols having more than one alcohol group such as ethylene glycol and the like are also suitable for use in the process of this invention.

The quantity of tartaric acid employed should be at least 3 grams of the acid per gallon of gasoline. Lesser amounts are not completely effective. Greater amounts can be employed, but no improvement has been found. The quantity of alcohol employed should be at least 45 milliliters of alcohol per gallon of gasoline. The required quantities of tartaric acid and alcohol were determined for an extraction process conducted at ambient temperatures. It is realized that some variations from these values may be found necessary or desirable under non-ambient process conditions.

The process of this invention can be conducted by several alternate procedures. As a batch process, the gasoline to be treated can be mixed with an alcohol solution of tartaric acid with agitation, the gasoline can be permitted to separate from the alcohol phase, and the purified gasoline can be removed. The tartaric acid and alcohol can also be separately added to the gasoline with agitation.

However, operation of the process of this invention on a continuous basis would be more expedient for a large petroleum refinery. The process of this invention can be carried out on a continuous basis using conventional petroleum solvent extraction facilities. In such a system, the gasoline could be introduced into the bottom of the column and an alcohol and tartaric acid mixture could be introduced into the top. Purified gasoline would then be recovered from the top of the column, and the alcohol phase containing the impurities would be recovered from the bottom.

This invention is further illustrated by the following specific but non-limiting examples.

EXAMPLE 1

This example shows the use of the process of this invention to remove undesirable components from commercial gasoline.

A methanol-tartaric acid solution containing 1 g. of tartaric acid per 15 ml. of methanol was prepared. A 48 ml. quantity of this solution was mixed with 1 gal. of Mobilgas regular gasoline obtained from a Mobil Corp. service station. Approximately 30 ml. of a heavy, dark colored liquid collected at the bottom of the gasoline.

The dark colored liquid was separated from the gasoline and examined. It was found to be non-combustible. A 30 ml. portion of the heavy liquid was boiled, and an almost solid, dark residue was formed.

EXAMPLE 2

In this example commercial gasoline was compared with the same gasoline treated according to the process of this invention as a fuel for an Edsel (1958) automobile containing a V-8 10:5–1 engine. The gasoline fuel tested was Marathon obtained from a Ohio Oil Corp. service station. A portion of the gasoline was treated by the procedure of Example 1.

The comparative test was made at a constant speed of 40 m.p.h. between the same points along a road. The ambient temperature during the test was between 65 and 70° F. The humidity was almost 100% since it was raining.

The test results showed that the gasoline treated according to the process of this invention effected an 18.7% increase in road mileage with respect to the untreated gasoline.

EXAMPLE 3

In this example, the operation of a Briggs & Stratton engine was compared using Mobil regular gasoline obtained from a Mobil Oil Company Corp. service station. A portion of the gasoline was treated by the procedure described in Example 1.

Using untreated gasoline, the gas feed rate was adjusted until the motor speed was 2,000 r.p.m. Then the treated gasoline sample was substituted as the fuel. The speed of the motor increased to 2,400 r.p.m., an increase in 20%.

In another test, a 4-cycle Briggs engine was completely cleaned and inspected. The engine was operated for 200 hours with gasoline treated according to the procedure of Example 1. The engine was then inspected, and no deposits were found on plugs, piston heads, cylinder walls, or valves, clearly proving the superior burning characteristics of gasoline after it has been treated by the process of this invention.

EXAMPLE 4

This example shows that the exhaust gases produced using gasoline treated according to this invention as a fuel for internal combustion engines exhibit a more complete combustion and contain much smaller quantities of harmful materials.

Phillips gasoline obtained from a Phillips 66 Corp. service station was used for the test. A portion of the gasoline was treated by the procedure of Example 1. Both the treated and untreated portions of the gasoline were used as fuel for a Briggs & Stratton engine. A 180 cubic inch volume of the exhaust gases produced using each of the samples was pumped through filter paper. The untreated gas left a dark residue on the filter paper, but the deposit left by the treated gasoline was hardly visible.

Another test was made to measure the toxicity of the exhaust gases from internal combustion engines using commercial treated and untreated gasoline as previously described. The test chamber had a depth of 16 in. and an open top. The exhaust gas inlet was located approximately 5 in. below the top of the chamber. The internal combustion engine, fueled with the treated gas, was started. A mouse was placed into the test chamber and observed. After about 3 minutes, the mouse stopped all movement. It was removed from the test chamber, and it revived shortly thereafter with apparently no ill effects. Then the internal combustion engine was started with the untreated gasoline fuel. Another mouse was placed in the test chamber. It was observed to stop moving after about 2 minutes and was removed from the chamber. Some movement was observed for several minutes, and then the mouse died.

As clearly demonstrated by this example, treatment of commercial gasolines by the process of this invention greatly improves the combustion characteristics thereof, and the exhaust gases produced have a much smaller concentration of unburned and toxic materials.

Obviously, many modifications and variations of the process of this invention can be made without departing from the essence and scope thereof, and only such limitations should be applied as are indicated in the claims.

The invention claimed is:

1. A process for improving the burning characteristics of gasoline fuels for internal combustion engines comprising the steps of mixing gasoline with 45 milliliters of an alcohol having from 1 to 4 carbon atoms and 3 grams of tartaric acid per gallon of gasoline, permitting the formation of a gasoline phase and an alcohol phase containing gum-forming constituents from the mixture, and recovering a purified gasoline phase which forms smaller quantities of obnoxious air pollutants when used as a fuel for internal combustion engines.

2. A process for improving the burning characteristics of gasoline fuels for internal combustion engines comprising the steps of contacting gasoline with 45 milliliters of a $C_1$ to $C_4$ alcohol solution containing 3 grams of tartaric acid per gallon of gasoline to be treated, permitting the separation of an alcohol phase containing gum-forming constituents from the gasoline, and recovering gasoline which forms smaller quantities of obnoxious air pollutants when used as a fuel for internal combustion engines.

3. A process for improving the burning characteristics of gasoline fuels for internal combustion engines comprising the steps of contacting gasoline with a $C_1$ to $C_4$ alcohol solution containing at least 45 milliliters of an alcohol having from 1 to 4 carbon atoms and at least 3 grams of tartaric acid per gallon of gasoline, permitting the separation of separating an alcohol phase containing gum-forming constituents from the gasoline, and recovering gasoline which forms smaller quantities of obnoxious air pollutants when used as a fuel for internal combustion engines.

References Cited

UNITED STATES PATENTS

| | | | |
|---|---|---|---|
| 2,068,850 | 1/1937 | Ellis | 208—255 |
| 2,087,582 | 7/1937 | Schneider | 44—56 |
| 2,104,021 | 1/1938 | Callis | 44—56 |
| 2,106,662 | 1/1938 | Savage | 44—56 |

DELBERT E. GANTZ, *Primary Examiner.*

SAMUEL P. JONES, *Examiner.*